(12) United States Patent
Wei et al.

(10) Patent No.: US 9,301,151 B2
(45) Date of Patent: Mar. 29, 2016

(54) FREQUENCY SPECTRUM ALLOCATION METHOD, DEVICE AND SYSTEM

(71) Applicant: Huawei Technologies Co., Ltd., Shenzhen (CN)

(72) Inventors: Xinpeng Wei, Shenzhen (CN); Lei Zhu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/496,874

(22) Filed: Sep. 25, 2014

(65) Prior Publication Data

US 2015/0011234 A1    Jan. 8, 2015

Related U.S. Application Data

(63) Continuation of application No. PCT/CN2013/073194, filed on Mar. 26, 2013.

(30) Foreign Application Priority Data

Mar. 29, 2012  (CN) .......................... 2012 1 0088095

(51) Int. Cl.
*H04W 72/00* (2009.01)
*H04W 16/14* (2009.01)
*H04W 72/04* (2009.01)
*H04W 16/04* (2009.01)
*G06F 17/30* (2006.01)
*H04W 72/12* (2009.01)

(52) U.S. Cl.
CPC ......... *H04W 16/14* (2013.01); *G06F 17/30312* (2013.01); *H04W 16/04* (2013.01); *H04W 72/04* (2013.01); *H04W 72/12* (2013.01)

(58) Field of Classification Search
CPC ..... H04W 16/04; H04W 16/14; H04W 72/04; H04W 72/12; G06F 17/30312
USPC .................... 455/454, 450, 451, 452.1, 452.2
See application file for complete search history.

(56) References Cited

U.S. PATENT DOCUMENTS

| | | | |
|---|---|---|---|
| 2005/0128971 A1* | 6/2005 | Huschke | H04W 28/26 370/328 |
| 2007/0032254 A1* | 2/2007 | Chen | H04W 16/14 455/509 |
| 2008/0008091 A1* | 1/2008 | Yumoto | H04L 12/5695 370/230 |
| 2012/0071188 A1 | 3/2012 | Wang et al. | |

FOREIGN PATENT DOCUMENTS

| | | |
|---|---|---|
| CN | 101909302 A | 12/2010 |
| WO | WO 2011/127445 A2 | 10/2011 |
| WO | WO 2012/003566 A1 | 1/2012 |

* cited by examiner

*Primary Examiner* — Khai M Nguyen
(74) *Attorney, Agent, or Firm* — Brinks Gilson & Lione (57) ABSTRACT

A spectrum allocation method, device and system are provided, which are capable of improving the flexibility and applicability of the frequency spectrum allocation system. The spectrum allocation method includes: a proxy server obtains a frequency spectrum allocation policy thereof; the proxy server obtains the frequency spectrum resources of the area managed by the proxy server from the frequency spectrum resources of the area managed by the database; the proxy server receives a frequency spectrum resource request transmitted by an access device; and according to the frequency spectrum allocation policy, the proxy server allocates at least one segment of the frequency spectrum resources for the access device from the frequency spectrum resources of the area managed by the proxy server; and the proxy server transmits to the access device the frequency spectrum resource information including the at least one segment of frequency spectrum resource.

20 Claims, 5 Drawing Sheets

FREQUENCY SPECTRUM ALLOCATION METHOD, DEVICE AND SYSTEM

CROSS-REFERENCE TO RELATED APPLICATIONS

This application is a continuation of International Application No. PCT/CN2013/073194, filed on Mar. 26, 2013, which claims priority to Chinese patent application No. 201210088095.8, filed on Mar. 29, 2012, both of which are incorporated herein by reference in their entireties.

FIELD

The present application relates to the field of communication, and in particular to a spectrum allocation method, device and system.

BACKGROUND

With the sharp increasing number of mobile terminals, a bandwidth resource of a mobile communication is in a short supply. White space allocation technique may release the shortage of the bandwidth resource to a great extent. The white space allocation technique may be applied to various applications, such as cellular network, wireless Local Area Network and broadband access, to expand the wireless bandwidth.

A spectrum management apparatus allocates a large amount of spectrum resources to wireless applications such as a television signal transmission. However, the allocated spectrum resources may not be used during a certain period in a certain area, resulting in a waste of spectrum resources. The unused spectrum resource is referred to as white space, which will be reallocated reasonably in the research.

An access device (Master) requests spectrum resources from a database to be communicated with a terminal device (Slave), such as a mobile phone or a laptop, via a white space resource in the spectrum resources. The database may store and manage information about the white space resource, store information about a usage scope and using time of the white space resource, and manage an implementation of an allocation policy of all the spectrum resources.

However, the allocation policy normally depends on an area, that is, different allocation policy may be applied to different countries or areas. A use of some spectrum resources may be constrained for some temporary requirements even in a relatively small area. Therefore, when a centralized management is applied, that is, all white space resources within a large region is managed by a unified database, it is difficult to quickly adjust the database to a change of spectrum resource allocation policy within a small area, resulting in an improper allocation of spectrum resources. For example, occupied or forbidden spectrum resources may be allocated to the terminal device, resulting in a waste of spectrum resources or a communication disturbance on the access device, and thus the flexibility and applicability of the spectrum allocation is reduced.

SUMMARY

According to embodiments of the application, a spectrum allocation method, device and system are provided, to allocate spectrum resources properly and improving the flexibility and applicability of a spectrum allocation system.

For the above purpose, the technical solution according to the embodiments of the application is as follows.

In one aspect, a spectrum allocation method is provided, which includes:

obtaining, by a proxy server, a spectrum allocation policy of the proxy server;

obtaining, by the proxy server, spectrum resources of a region managed by the proxy server, from spectrum resources of a region managed by a database, where the spectrum resources of the region managed by the database are sent by the database;

receiving, by the proxy server, a spectrum resource request from an access device;

allocating, by the proxy server, for the access device at least one spectrum resource range from the spectrum resources of the region managed by the proxy server based on the spectrum allocation policy; and sending, by the proxy server, spectrum resource information comprising the at least one spectrum resource range to the access device.

In one aspect, a spectrum allocation method is provided, which includes:

sending, by an access device, a spectrum resource request to a proxy server, wherein the proxy server allocates at least one spectrum resource range for the access device from spectrum resources of a region managed by the proxy server, based on a spectrum allocation policy of the proxy server;

receiving, by the access device, spectrum resource information comprising the at least one spectrum resource range from the proxy server; and obtaining, by the access device, available spectrum resources for the access device from the spectrum resource information comprising the at least one spectrum resource range.

In one aspect, a proxy server is provided, which includes:

an obtaining unit configured to obtain a spectrum allocation policy of the proxy server; wherein the obtaining unit is further configured to obtain spectrum resources of a region managed by the proxy server, from spectrum resources of a region managed by a database, where the spectrum resources of the region managed by the database are sent by the database;

a transmission unit configured to receive a spectrum resource request from an access device; and an allocating unit configured to allocate at least one spectrum resource range for the access device from the spectrum resources of the region managed by the proxy server based on the spectrum allocation policy obtained by the obtaining unit, where the spectrum resources of the region managed by the proxy server are obtained by the obtaining unit; wherein the transmission unit is further configured to send to the access device the at least one spectrum resource range allocated by the allocating unit.

In one aspect, an access device is provided, which includes:

a sending unit configured to send a spectrum resource request to a proxy server, where the proxy server allocates at least one spectrum resource range for the access device from spectrum resources of a region managed by the proxy server, based on a spectrum allocation policy of the proxy server;

a receiving unit configured to receive spectrum resource information comprising the at least one spectrum resource range from the proxy server; and a selecting unit configured to obtain available spectrum resources for the access device from the spectrum resource information comprising the at least one spectrum resource range.

In one aspect, a spectrum allocation system is provided, which includes:

a proxy server described above;

an access device described above; and a database configured to manage the proxy server and the access device.

A spectrum allocation method, device and system are provided, in which a proxy server obtains a spectrum allocation policy of the proxy server; the proxy server obtains spectrum resources of a region managed by the proxy server from spectrum resources of a region managed by a database, where the spectrum resources of a region managed by a database are sent by the database; the proxy server receives a spectrum resource request from an access device; the proxy server allocates at least one spectrum resource range for the access device from the spectrum resources of the region managed by the proxy server, based on the spectrum allocation policy; and the proxy server sends spectrum resource information including the at least one spectrum resource range to the access device. By this way, the proxy server allocates spectrum resources for the access device from the spectrum resources of the region managed by the proxy server based on the spectrum allocation policy of the proxy server. Compared with the conventional technology, the proxy server undertakes a part of functions of the database, and the burden of the database is reduced. In addition, the proxy server is capable of making a quick adjustment based on a change of the spectrum allocation policy of the region managed by the proxy server, and thus the spectrum resource is reasonably allocated. Thus, the flexibility and applicability of the entire spectrum allocation system is improved.

BRIEF DESCRIPTION OF THE DRAWINGS

In order to clearly specify the technical solutions according to the embodiments of the application and the existing technologies, the drawings in the embodiments and the existing technical solutions may be briefly described. Obviously, the following drawings are only part of the embodiments of the application, and those skilled in the art may obtain other drawings according to these drawings without creative work.

DETAILED DESCRIPTION OF EMBODIMENTS

The technical solutions according to the embodiments of the application may clearly and completely be specified below in conjunction with drawings. Obviously, the embodiments are only a part of the embodiments of the application, but not all. Based on the embodiments of the application, other embodiments made by those skilled in the art without creative work may fall into the protection scope of the application.

Figure 1:
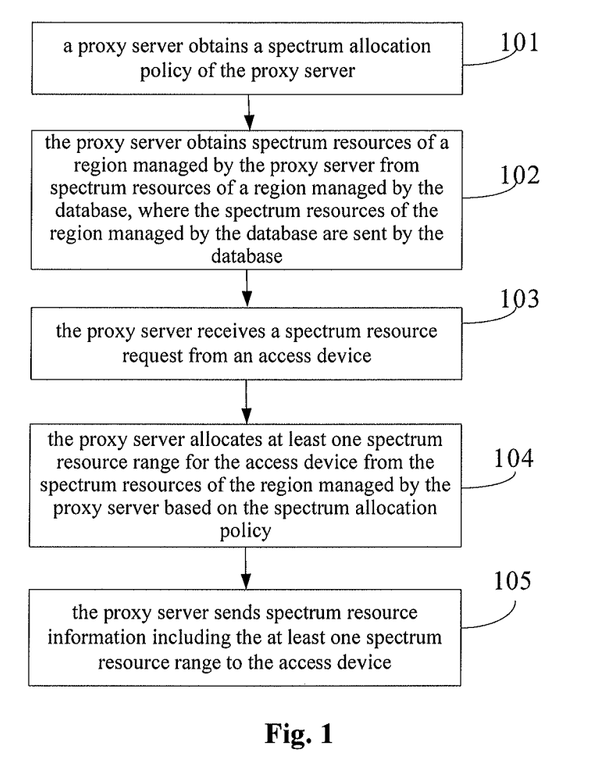
FIG. 1 is a flowchart of a spectrum allocation method according to an embodiment of the application.

According to an embodiment of the application, a spectrum allocation method is provided. Referring to FIG. 1, the method includes:

In 101, a proxy server obtains a spectrum allocation policy of the proxy server.

In 102, the proxy server obtains spectrum resources of a region managed by the proxy server from spectrum resources of a region managed by the database, where the spectrum resources of the region managed by the database are sent by the database.

In 103, the proxy server receives a spectrum resource request from an access device.

In 104, the proxy server allocates at least one spectrum resource range for the access device from the spectrum resources of the region managed by the proxy server based on the spectrum allocation policy.

In 105, the proxy server sends spectrum resource information including the at least one spectrum resource range to the access device. It needs to be noted that the spectrum resource range refers to a spectrum with a certain central frequency and a certain bandwidth.

In the conventional technology, an access device interacts with a database directly. In a relatively large region, a database is usually provided to mange all of access devices in this region. In the spectrum allocation method according to the embodiment of the application, a proxy server is added between the database and the access devices. Thus, in a relatively large region, a database is provided to manage all of proxy servers in this region, and each proxy server manages access devices within a region managed by the proxy server. The proxy server interacts with the access device to allocate spectrum resources for the access device. The database interacts with the proxy server to allocate spectrum resources for the proxy server. Accordingly, the proxy server undertakes a part of functions of the database.

In this way, the proxy server allocates spectrum resources for the access device from the spectrum resources of the region managed by the proxy server based on the spectrum allocation policy. Compared with the conventional technology, the proxy server undertakes a part of functions of the database, and the burden of the database is reduced. In addition, the proxy server is capable of making a quick adjustment based on a change of the spectrum allocation policy of the region managed by the proxy server, and thus the spectrum resource is reasonably allocated. Thus, the flexibility and applicability of the entire spectrum allocation system is improved.

The embodiment of the application is applicable to the allocation of white space. That is, in a relatively large area, a database is configured to manage all of proxy servers, and each proxy server manages access devices within a region managed by the proxy server. The database stores white space resources of the region managed by the database. A proxy server interacts with the database to obtain white space resources of the region managed by the proxy server. An access device may request white space resources to the proxy server, by which a terminal device, such as a mobile phone or a laptop, may obtain the white space resources to communicate. It needs to be noted that it is only exemplary to apply the spectrum allocation method according to the embodiment of the application to allocate white space, and any spectrum allocation methods according to embodiments of the application may be applied to allocate white space, which will be omitted herein.

In 102, the proxy server obtains spectrum resources of a region managed by the proxy server from spectrum resources of a region managed by the database by several ways, where the spectrum resources of the region managed by the database are sent by the database. In one embodiment, the interaction may be triggered by the database. The proxy server receives spectrum updating information from the database. Then the proxy server receives spectrum resources of the region managed by the database; and selects and stores spectrum resources of the region managed by the proxy server from the spectrum resources of the region managed by the database, based on a spectrum usage situation of the region managed by the proxy server and the spectrum allocation policy. Particularly, the database stores a scope of the proxy server, rather than the spectrum usage situation of the proxy server and the spectrum allocation policy. Therefore, the spectrum resources sent from the database to the proxy server only includes spectrum resources unused at present period within the region managed by the proxy server. Accordingly, after receiving the spectrum resources of the region managed by the database, the proxy server needs to selectively store the received spectrum resources, based on the spectrum usage situation of the region managed by the proxy server and the spectrum allocation policy stored in the proxy server.

In another embodiment, the interaction may be initiatively triggered by the proxy server. The proxy server sends a spectrum updating request to the database. The database sends spectrum resources of the region managed by the database to the proxy server in respond to the spectrum updating request. The proxy server receives the spectrum resources of the region managed by the database, and selects and stores spectrum resources of the region managed by the proxy server from the spectrum resources of the region managed by the database, based on the spectrum usage situation of the region managed by the proxy server and the spectrum allocation policy. Particularly, because the database stores information about all available spectrums without considering spectrum resources of a certain region, the database sends information about all available spectrums to the proxy server. Therefore, the proxy server needs to selectively store the spectrum resources sent by the database, based on the spectrum usage situation of the region managed by the proxy server, and then updates database of the proxy server based on the selected spectrum resources.

Figure 2:
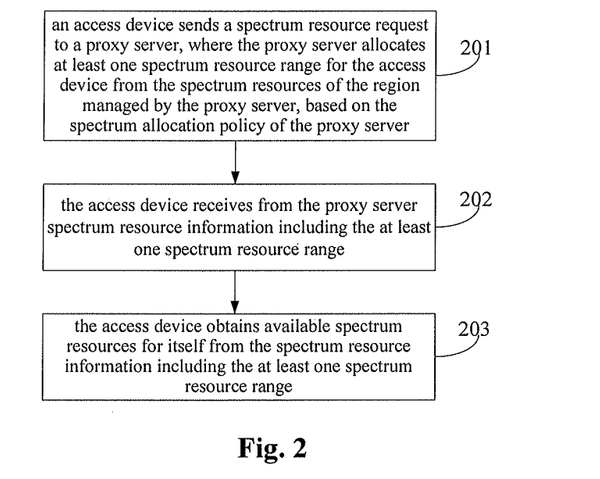
FIG. 2 is a flowchart of another spectrum allocation method according to an embodiment of the application.

According to an embodiment of the application, a spectrum allocation method is further provided, as shown in FIG. 2. The method includes:

In 201, an access device sends a spectrum resource request to a proxy server, where the proxy server allocates at least one spectrum resource range for the access device from the spectrum resources of the region managed by the proxy server, based on the spectrum allocation policy of the proxy server.

The access device is further configured to send a spectrum allocation parameter to the proxy server, where the proxy server calculates available spectrum resources for the access device based on the spectrum allocation policy and the spectrum allocation parameter.

In 202, the access device receives from the proxy server spectrum resource information including the at least one spectrum resource range.

In 203, the access device obtains available spectrum resources for itself from the spectrum resource information including the at least one spectrum resource range.

By this way, the proxy server allocates spectrum resources for the access device from the spectrum resources of the region managed by the proxy server based on the spectrum allocation policy of the proxy server. Compared with the conventional technology, the proxy server undertakes a part of functions of the database, and the burden of the database is reduced. In addition, the proxy server is capable of making a quick adjustment based on a change of the spectrum allocation policy of the region managed by the proxy server, and thus the spectrum resource is reasonably allocated. Thus, the flexibility and applicability of the entire spectrum allocation system is improved.

Figure 3:
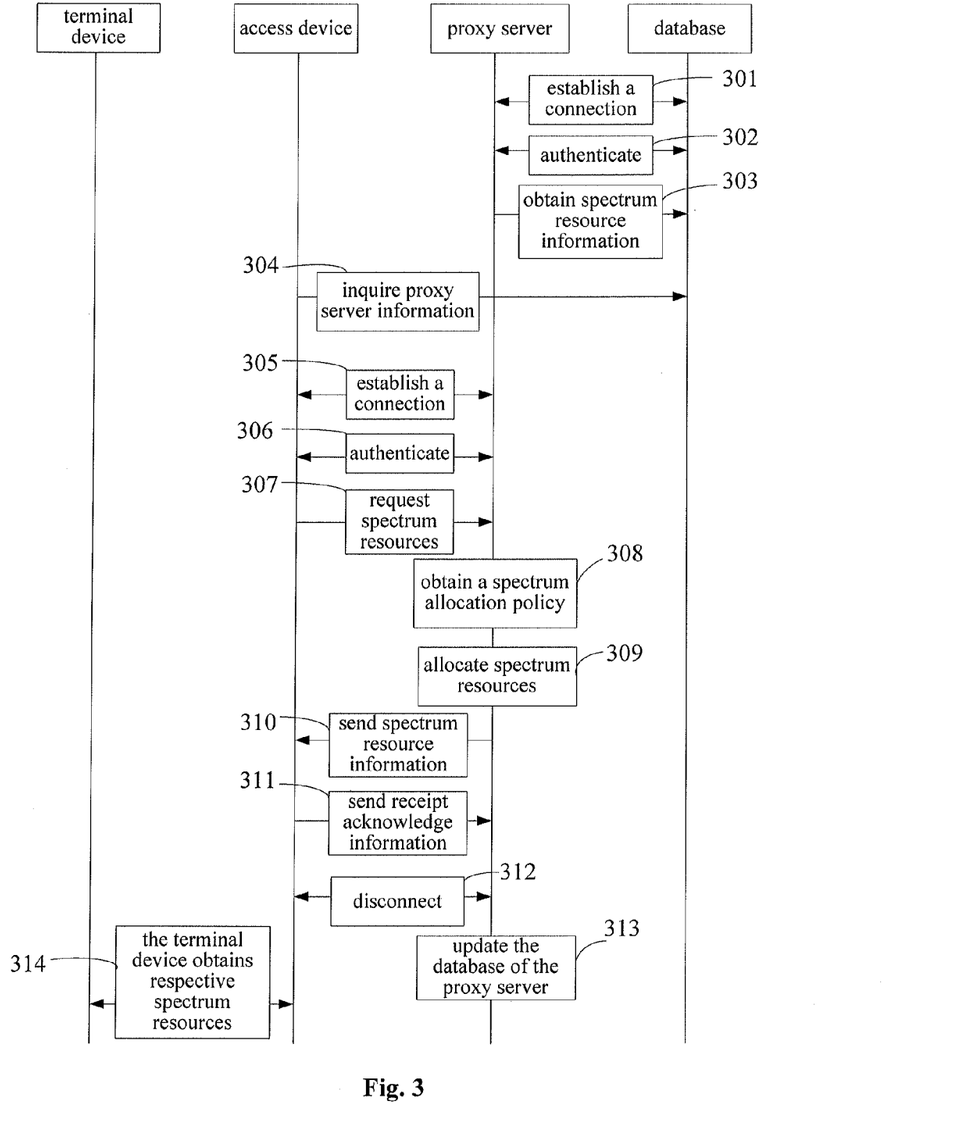
FIG. 3 is a flowchart of yet another spectrum allocation method according to an embodiment of the application.

According to an embodiment of the application, a spectrum allocation method is f concretely provided, as shown in FIG. 3. The method includes:

In 301, a connection is established between a proxy server and a database.

The connection may be established between the proxy server and the database by several ways. For example, the database may establish the connection to the proxy server by presetting a database identifier or in a dynamic inquiring manner, by which the interaction may be performed subsequently between the proxy server and the database.

In 302, the database performs an authentication on the proxy server.

The database needs to confirm a validity of the proxy server. The authentication may be performed by a user name and a password or by a digital signature. The authenticated proxy server registers related information to the database. The related information may include a proxy server identification (Identification, ID), information about a manager and maintainer of the proxy server, information about a geographic location of the proxy server, information about a scope of the proxy server, information about a main application field of the proxy server and so on.

In 303, the proxy server obtains spectrum resources of the region managed by the proxy server from the database.

The proxy server may send a spectrum updating request to the database periodically, or adopt other spectrum updating policy. An updating period or the updating policy may be decided by the management and maintenance entity of the proxy server.

In one embodiment, the policy may be that the proxy server receives spectrum updating information from the database; and then the proxy server receives spectrum resources of the region managed by the database, and selects and stores spectrum resources of the region managed by the proxy server from the spectrum resources of the region managed by the database based on the spectrum usage situation of the region managed by the proxy server and the spectrum allocation policy. The policy may further be that the proxy server sends a spectrum updating request to the database; the database sends spectrum resources of the region managed by the database to the proxy server in respond to the spectrum updating request; the proxy server receives the spectrum resources of the region managed by the database, and selects and stores spectrum resources of the region managed by the proxy server from the spectrum resources of the region managed by the database based on the spectrum usage situation of the region managed by the proxy server and the spectrum allocation policy.

In 304, an access device inquires proxy server information on the database, to determine the proxy server configured to manage the access device.

Before sending the spectrum resource request to a proxy server, the access device needs to inquire and determine the proxy server configured to manage the access device. The inquiring may be implemented in a manual configuration manner or in an active inquiring manner.

Specifically, the active inquiring manner includes the following steps. The access device establishes, based on a preset database host identifier such as a respective IP (Internet Protocol, internet protocol) address, a connection to a database with the database host identifier. Then, the access device sends inquiring information of the proxy server configured to manage a region including a location of the access device, to the database with the database host identifier. The database with the database host identifier sends available proxy server information to the access device according to the location of the access device. At last, the access device receives the available proxy server information, and selects, from the available proxy server information, a proxy server to which the spectrum resource request is sent. Particularly, when sending the inquiring information of the proxy server configured to manage a region including a location of the access device, the access device may also send scope information and other information of the access device to enhance the restriction for the database selecting available proxy server, so as to avoid a waste of resources. The available proxy server information includes information about all proxy servers capable of providing available spectrum for the access device. The proxy server information may further include scope information of the proxy servers.

The access device receives the available proxy server information and selects a proxy server from the proxy servers provided in the available proxy server information. It needs to be noted that the region managed by some available proxy servers may not cover the location of the access device, or some available proxy servers cannot provide available spectrum resources due to its own allocation policy. Therefore, not all of the proxy servers provided in the available proxy server information may provide available spectrum resources for the access device. Once receiving the available proxy server information, the access device may select a proxy server based on a preset selecting rule from the proxy servers provided in the available proxy server information, or may select a proxy server randomly from the proxy servers provided in the available proxy server information.

It needs to be noted that, the proxy server selected by the access device may not be able to manage the access device, thus the access device needs to send a spectrum application to the selected proxy server. If the application is successful, the process ends and the selected proxy server is the proxy server configured to manage the access device. If the selected proxy server cannot provide spectrum resources, the application is failed and the access device selects another proxy server and repeats the above application process until that the access device obtains spectrum resources or none of the proxy servers in the available proxy server information is able to provide spectrum resources to the access device.

Alternatively, the access device may inquire a respective proxy server in a manual configuration manner. The manual configuration manner includes the following steps. The access device sends, based on a preset proxy server identifier such as IP address, a spectrum resource request to the respective proxy server. The proxy server identifier is manually set. In this way, the access device may automatically send the spectrum resource request to the proxy server after being started. The manual configuration manner is relatively simple. In the case that the location of the proxy server is changed, a new proxy server identifier may be set again. The above aim proxy server is the proxy server configured to manage the access device.

It needs to be noted that, 304 may be performed before 301. In the spectrum allocation method according to the embodiment of the application, the sequence of steps is only an example, which will not be limited herein in practice. Other variations of the method may be obvious to those skilled in the art within the scope of the disclosed technique, which will not be described herein.

It is assumed that the proxy server in FIG. 3 is the proxy server configured to manage the access device.

In 305, a connection is established between the access device and the proxy server.

The connection may be established between the access device and the proxy server by various ways. For example, the access device may establish the connection to the proxy server by presetting a proxy server identifier or in a dynamic inquiring manner, by which the interaction may be performed subsequently between the proxy server and the database.

In step 306, the proxy server performs an authentication on the access device.

The proxy server needs to confirm a validity of the access device to avoid accessing the proxy server by an unauthenticated access device. The authentication may be performed by a user name and a password or by a digital signature.

In 307, the proxy server receives a spectrum resource request from the access device.

The spectrum resource request includes parameters such as the location of the access device, the access device identification, a scope of the access device, an antenna characteristic of the access device, a bandwidth requirement of the access device and a usage time of the access device, to facilitate the proxy server allocating proper spectrum resources to the access device.

It needs to be noted that, the access device may send the spectrum resource request to a respective proxy server based on a preset proxy server identifier. Alternatively the access device may send the request to the database; and the database may redirect the spectrum resource request and send the redirected spectrum resource request to the proxy server. In this way, the inquiring proxy server information in step 304 is not necessary. In the latter manner, the proxy server may send access permitting information to the access device after receiving a spectrum resource redirecting request. The access device performs 305, 306 and 308 in sequence after receiving the access permitting information.

It needs to be noted that, in the spectrum allocation method according to the embodiment of the application, the steps and the sequence of the steps are only an example, which will not be limited herein in practice. Other variations of the method may be obvious to those skilled in the art within the scope of the disclosed technique, which are within the protection scope of the application.

In 308, the proxy server obtains a spectrum allocation policy of the proxy server.

The proxy server may be operated and maintained by a supervision organization in charge of a certain region, or by a communication operator or an accredited company. These operation and maintenance entity may constitute different spectrum allocation policy for different proxy server under the charge of itself. Even if the spectrum allocation policy is changed, the proxy server may obtain the changed spectrum allocation policy in time.

In 309, the proxy server allocates at least one spectrum resource range from spectrum resources of the region managed by the proxy server, based on the spectrum allocation policy of the proxy server.

Before the step 309, the proxy server needs to receive a spectrum allocation parameter from the access device. The proxy server may store the received spectrum allocation parameter. The proxy server may be operated and maintained by a supervision organization in charge of a certain region, or by a communication operator or an accredited company.

These operation and maintenance entity may constitute different spectrum allocation policy for different proxy servers under the charge of itself. The proxy server obtains and stores the spectrum allocation policy. After the authentication is successful, the proxy server performs a spectrum determination function. The spectrum determination function includes: calculating, by the proxy server, available spectrum resources for the access device based on the spectrum allocation policy and the spectrum allocation parameter; and selecting, by the proxy server, one spectrum resource range from the available spectrum resources to generate the spectrum resource information; alternatively, selecting, by the proxy server, two or more spectrum resource range from the available spectrum resources to generate the spectrum resource information.

The spectrum allocation parameter mainly includes: a parameter related to a geographic location of the access device, such as a geographic coordinate, a precision of the geographic coordinate, a covered scope; the antenna characteristic of the access device, such as a height of the antenna, a maximal transmission power, a direction angle, a frequency bandwidth, an antenna gain; an application scenarios and a service type of the access device, for example, a broadband access and multimedia broadcast multicast service provided by the access device. The spectrum allocation parameter further includes a terrain parameter, such as a terrain situation, the altitude; a capacity requirement, such as the number of accessible device; and a surrounding wireless environment parameter. Moreover, the spectrum allocation parameter may further includes parameters related to the access device, such as a device ID, a device manufacturer information, and a device performance, and may also includes a transmission bandwidth requested by the Master, a white space occupying time and the like. Particularly, the spectrum allocation parameter according to the application includes one of or any combination of the above parameters.

In 310, the proxy server sends to the access device the spectrum resource information including the at least one spectrum resource range.

The spectrum resource information sent by the proxy server may include the spectrum resource allocated for the access device, and a respective parameter thereof such as a spectrum available time, a maximal transmission power of the antenna of the access device.

In 311, the access device sends receipt acknowledge information to the proxy server.

After receiving the spectrum resource information from the proxy server, the access device directly replies receipt acknowledge information to the proxy server, in the case that the spectrum resource allocated for the access device includes one spectrum resource range in the available spectrum resources. In the case that the spectrum resource information includes two or more spectrum resource ranges, the access device may scan an adjacent access device to obtain spectrum usage information of the adjacent access device, and selects an available spectrum resources for itself from the above spectrum resource information based on the spectrum usage information. Alternatively, the access device may scan each of spectrum resource ranges in the spectrum resource information to select an unused spectrum resource as an available spectrum resource for the access device. Then, the access device replies to the proxy server the receipt acknowledge information which includes information about the spectrum resources selected by the access device.

In 312, the access device disconnects with the proxy server.

Because the access device has obtained the required spectrum resources, the connection with the proxy server is unnecessary to be kept. When the access device needs to apply spectrum resources again, it may establish the connection to the proxy server again.

In 313, the proxy server updates a database thereof.

After allocating the spectrum resource for the access device, the proxy server records information related to the access device, such as an ID, a geographic location of the access device and the spectrum resources allocated for the access device.

In 314, a terminal device interacts with the access device to obtain respective spectrum resources.

The terminal device sends a connection request to the access device. The access device allocates a communication channel for the terminal device after the connection is established successfully. After the above steps, the terminal device may communicate through an available spectrum, the procedure of which will not be described herein since it belongs to a conventional technology.

It needs to be noted that, the proxy server mentioned above may include N layers of sub-servers, and each of the N layers includes at least one sub-server, in which N is an integer greater than 1. In this case, the method may include as follows.

Each layer of the sub-server obtains spectrum allocation policy for itself.

The sub-server in the K-th layer of the N layers obtain spectrum resources of the region managed by the sub-server in the K-th layer from the spectrum resources of the region managed by the sub-server in an upper layer of the K-th layer, where the spectrum resources of the region managed by the sub-server in the upper layer of the K-th layer is sent from the sub-servers in the upper layer of the K-th layer, and where K is an integer greater than or equal to 1 and smaller than or equal to N. The sub-server in the upper layer of the K-th layer is a sub-server in the (K−1)-th layer, which manages the region of the sub-sever in the K-th layer.

The K-th layer of sub-server receives a spectrum resource request from the sub-server in a lower layer of the K-th layer.

The K-th layer of sub servers allocate at least one spectrum resource range for the sub-server in the lower layer of the K-th layer from the spectrum resources of the region managed by the sub-server in the K-th layer, based on the spectrum allocation policy of the K-th layer of sub-server.

The K-th layer of sub-server send spectrum resource information including the at least one spectrum resource range to the sub-server in the lower layer of the K-th layer. The sub-server in the lower layer of the K-th layer is a sub-server in the (K+1)-th layer, which is located in a region managed by the sub-server in the K-th layer.

Specially, when K=N, the sub-server in the lower layer of the K-th layer is the access device. When K=1, the sub-server in the upper layer of the K-th layer is the database.

In the case that a new sub-server is added into the K-th layer of sub-server, that is, in the case that the K-th layer of sub servers includes both a new added sub-server and an existing sub-server, the spectrum allocation method according to an embodiment of the application may further include steps as follows.

The new added sub-server of the K-th layer sends spectrum resources application for a certain region to a sub-server in the upper layer of the K-th layer. The sub-server in the upper layer of the K-th layer judges whether an overlapped management region is existed between the new added sub-server and the existing sub-server of the K-th layer based on the certain region. The certain region is a region managed by the new added sub-server of the K-th layer.

If there is an overlapped management region, the new added sub-server of the K-th layer receives spectrum resources of the region managed by the sub-server in the upper layer of the K-th layer, overlapped region information and network address information of an overlapping sub-server from the sub-server in the upper layer of the K-th layer. The overlapping sub-server is an existing sub server of the K-th layer, which has an overlapped management region with the new added sub-server of the K-th layer.

The new added sub server of the K-th layer receives a spectrum resource request from a sub-server in the lower layer of the K-th layer; and then the new added sub-server of the K-th layer allocates at least one spectrum resource range for the sub-server in the lower layer of the K-th layer.

Further, in the case that a sub-server in the lower layer of the K-th layer is in the overlapped management region, available spectrum resources may be allocated by various ways.

For example, the new added sub-server of the K-th layer and the overlapping sub-server may inquire to each other to coordinate the spectrum allocation.

The new added sub-server of the K-th layer sends overlapped region inquiring information to the overlapping sub-server. The overlapping sub server inquires the spectrum allocation situation thereof, and then sends spectrum allocation situation information of the overlapping sub server to the new added sub-server of the K-th layer.

The new added sub-server of the K-th layer receives the spectrum allocation situation information of the overlapping sub-server in the existing sub-server of the K-th layer.

The new added sub-server of the K-th layer allocates at least one spectrum resource range for the sub-server in the lower layer of the K-th layer from the spectrum resources of the region managed by the new added sub-server of the K-th layer, based on the spectrum allocation situation information and the spectrum allocation policy of the new added sub-server in the K-th layer, where the sub-server in the lower layer of the K-th layer is located in the overlapped management region.

Figure 4:
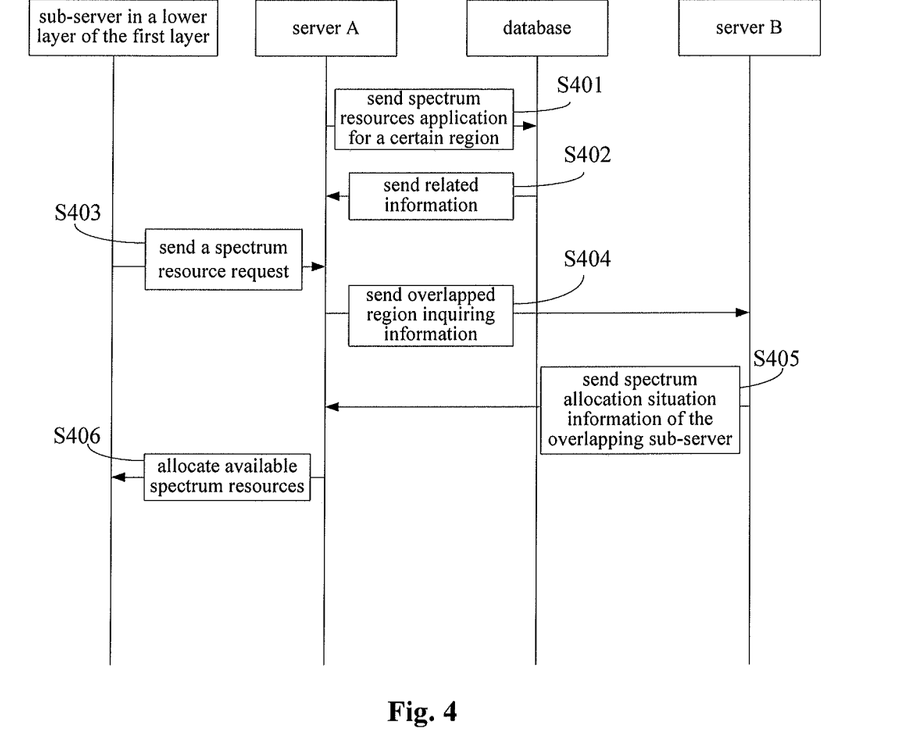
FIG. 4 is a flowchart of still another spectrum allocation method according to an embodiment of the application.

When K=1, the sub server in the upper layer of the first layer is the database, that is, the database manages the first layer of sub-server. Assuming that the new added sub-server of the first layer is a server A, the server A has an overlapped management region with the existing sub-servers in the first layer, and server B is one overlapping sub-server in the existing sub-servers of the first layer, the spectrum allocation method may includes S401 to S406 as shown in FIG. 4.

In S401, the server A sends a spectrum resource application for a certain region to the database, and the database judges whether the server A has an overlapped management region with the existing server of the first layer based on the certain region, where the certain region is the region in which the server A is located.

In S402, the database sends related information to the server A if there is the overlapped management region.

If there is the overlapped management region, the database calculates all the overlapped management regions of the server A and the existing sub-servers of the first layer and sends related information to the server A. The related information sent by the database includes spectrum resources of the region managed by the server A, overlapped region information and information about the overlapping sub-server in the existing sub-server of the first layer.

In S403, a sub-server in the lower layer of the first layer sends a spectrum resource request to the server A. The sub-server in the lower layer of the first layer is a sub-server in the second layer, which is located in the region managed by the server A.

In S404, the server A sends overlapped region inquiring information to the overlapping sub-server in the existing sub-servers of the first layer, where the overlapping sub-server in the existing sub-servers of the first layer includes server B. The overlapping sub-server in the existing sub servers of the first layer inquiries the spectrum allocation situation thereof and replies the spectrum allocation situation to the server A.

In S405, the overlapping sub-server in the existing sub-servers of the first layer sends spectrum allocation situation information of the overlapping sub-server to the server A, where the overlapping sub-server in the existing sub-servers of the first layer includes the server B. Accordingly, the server A receives the spectrum allocation situation information of the overlapping sub-server in the existing sub-servers of the first layer.

In S406, the server A allocates at least one spectrum resource range to the sub-server in the lower layer of the first layer based on the spectrum allocation situation information and the spectrum allocation policy of the server A, where the sub-server in the lower layer of the first layer is located in the overlapped area. The server A obtains overlapping sub-server information of the existing sub servers of the first layer from the database, where the overlapping sub-server information includes information about the server B. When an access device in the overlapped region request a spectrum resource, the server A inquires the overlapping sub-server and then allocates the available spectrums based on the spectrum allocation information of the overlapping sub-server and the spectrum allocation policy.

In particular, when K is not equal to 1, the interaction between a new added sub-server of the K-th layer and the sub-server in the upper layer of the K-th layer is substantially the same as that of the server A and the database, the corresponding modified method is obvious to those skilled in the art, which will not be described herein.

For another example, the overlapped region spectrum allocation may be performed by the sub-server in the higher layer of the K-th layer.

The new added server of the K-th layer sends overlapped region spectrum allocation situation inquiring information to the sub-server in the upper layer of the K-th layer. The sub-server in the upper layer of the K-th layer sends spectrum allocation situation information to the new added server of the K-th layer.

The new added server of the K-th layer receives the spectrum allocation situation information and allocates at least one spectrum resource range for the sub-server in the lower layer of the K-th layer from the spectrum resources of the region managed by the new added server of the K-th layer, based on the spectrum allocation situation information and the spectrum allocation policy of the new added server of the K-th layer, where the sub-server in the lower layer of the K-th layer is located in the overlapped management region.

For yet another example, the new added server of the K-th layer may perform the overlapped region spectrum allocation and then informs to the overlapping sub-server.

The new added server of the K-th layer allocates at least one spectrum resource range for the sub-server in the lower layer of the K-th layer from the spectrum resources of the region managed by the new added server of the K-th layer, based on the overlapped region information and the spectrum allocation policy of the new added server of the K-th layer, where the sub-server in the lower layer of the K-th layer is located in the overlapped management region.

The new added server of the K-th layer send an overlapped region spectrum allocation notification to the overlapping sub-server in the existing sub-servers of the K-th layer, based on network address information of the overlapping sub-server in the existing sub-servers of the K-th layer. The overlapping sub-server in the existing sub-servers of the K-th layer updates spectrum resources of its overlapped region.

In particular, according to step 309, the proxy server may select one spectrum resource range from the available spectrum resources to generate spectrum resource information. Alternatively, the proxy server may select two or more spectrum resource ranges in the available spectrum resources to generate the spectrum resource information.

In the case that the proxy server selects two or more spectrum resource ranges in the available spectrum resources to generate the spectrum resource information, after receiving the spectrum resource information, the access device may scan an adjacent access device to obtain spectrum usage information of the adjacent access device and selects available spectrum resources for itself from the above spectrum resource information based on the spectrum usage information. Alternatively, the access device may scan the various spectrum resource ranges in the spectrum resource information to select unused spectrum resources as available spectrum resources for the access device.

By this way, the above a procedure for coordinating the spectrum allocation by the proxy server may be avoided when the access device is in the overlapped region, and thus the workload of the proxy server is reduced.

In the spectrum allocation method according to the embodiment of the application, the proxy server allocates spectrum resources for the access device from the spectrum resources of the region managed by the proxy server based on a spectrum allocation policy of the proxy server. Compared with the conventional technology, the proxy server undertakes a part of functions of the database, the burden of the database is reduced. In addition, the proxy server is capable of making a quick adjustment based on a change of the spectrum allocation policy of the region managed by the proxy server, and thus the spectrum resource is reasonably allocated. Thus, the flexibility and applicability of the entire spectrum allocation system is improved. The embodiment is applicable to the allocation of white space.

Figure 5:
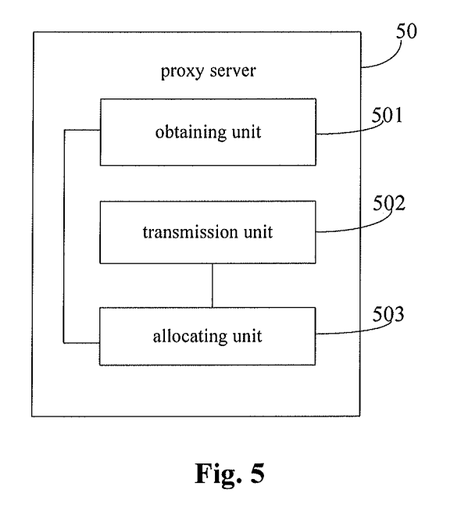
FIG. 5 is a schematic structural diagram of a proxy server according to an embodiment of the application.

According to an embodiment of the application, a proxy server 50 is provided as shown in FIG. 5. The proxy server 50 includes an obtaining unit 501, a transmission unit 502, and an allocating unit 503.

The obtaining unit 501 is configured to obtain a spectrum allocation policy of the proxy server 50.

The obtaining unit 501 is further configured to obtain spectrum resources of a region managed by the proxy server from spectrum resources of a region managed by a database, where the spectrum resources of the region managed by the database are sent by the database.

The transmission unit 502 is configured to receive a spectrum resource request from an access device.

The transmission unit 502 is further configured to receive a spectrum allocation parameter from the access device.

The allocating unit 503 is configured to allocate for the access device at least one spectrum resource range from the spectrum resources of the region managed by the proxy server based on the spectrum allocation policy obtained by the obtaining unit 501, where the spectrum resources of the region managed by the proxy server are obtained by the obtaining unit 501.

The transmission unit 502 is further configured to send to the access device the at least one spectrum resource range allocated by the allocating unit 503.

In this way, the allocating unit of the proxy server allocates spectrum resources for the access device from the spectrum resources of the region managed by the proxy server based on the spectrum allocation policy obtained by the obtaining unit, where the spectrum resources of the region managed by the proxy server are obtained by the obtaining unit. Compared with the conventional technology, the proxy server undertakes a part of functions of the database, and the burden of the database is reduced. In addition, the proxy server is capable of making a quick adjustment based on a change of the spectrum allocation policy of the region managed by the proxy server, and thus the spectrum resource is reasonably allocated. Thus, the flexibility and applicability of the entire spectrum allocation system is improved. The embodiment is applicable to the allocation of white space.

Figure 6:
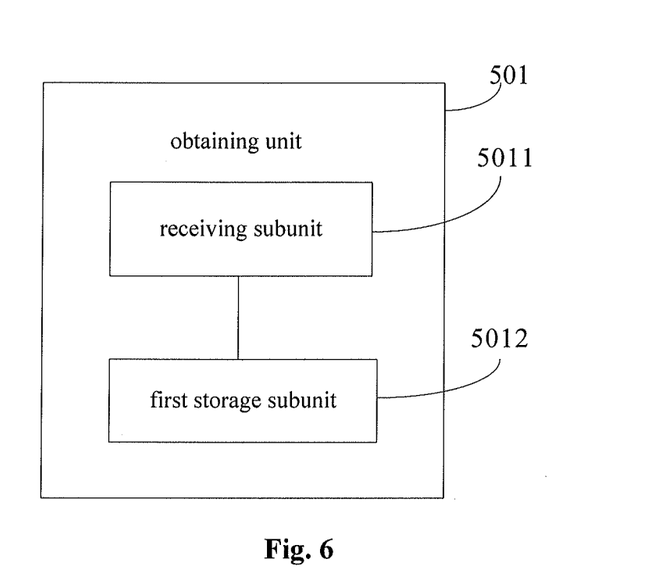
FIG. 6 is a schematic structural diagram of an obtaining unit according to an embodiment of the application.

As shown in FIG. 6, the obtaining unit 501 may further include:

a receiving subunit 5011 configured to receive spectrum updating information from the database; and a first storage subunit 5012 configured to receive spectrum resources of the region managed by the database, and select and store the spectrum resources of the region managed by the proxy server from the spectrum resources of the region managed by the database based on the spectrum usage situation of the region managed by the proxy server and the spectrum allocation policy obtained by the obtaining unit 501.

Figure 7:
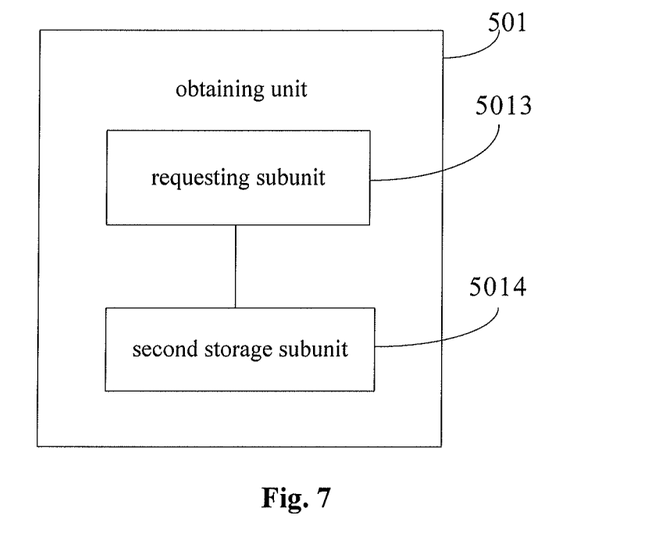
FIG. 7 is a schematic structural diagram of another obtaining unit according to an embodiment of the application.

In particular, as shown in FIG. 7, the obtaining unit 501 may further include:

a requesting subunit 5013 configured to send a spectrum updating request to the database, where the database sends the spectrum resources of the region managed by the database to the proxy server in response to the spectrum updating request; and a second storage subunit 5014 configured to receive spectrum resources of the region managed by the database, and select and store the spectrum resources of the region managed by the proxy server from the received spectrum resources of the region managed by the database based on the spectrum usage situation of the region managed by the proxy server and the spectrum allocation policy obtained by the obtaining unit 501.

In particular, the allocating unit 503 is specifically configured to:

calculate available spectrum resources for the access device based on the spectrum allocation policy obtained by the obtaining unit 501 and the spectrum allocation parameter received by the transmission unit 502; and select one spectrum resource range from the available spectrum resources to generate the spectrum resource information or select two or more spectrum resource ranges in the available spectrum resources to generate the spectrum resource information.

Specifically, the spectrum allocation parameter received by the transmission unit 502 includes any one of a parameter related to a geographic location of the access device, an antenna characteristic of the access device, an application scenario of the access device, a service type of the access device, a terrain parameter of the access device, a capacity requirement of the access device, a surrounding wireless environment parameter of the access device, or any combination thereof.

In the proxy server according to the embodiment of the application, the allocating unit of the proxy server allocates spectrum resources for the access device from the spectrum resources of the region managed by the proxy server based on its own spectrum allocation policy obtained by the obtaining unit, where the spectrum resources of the region managed by the proxy server are obtained by the obtaining unit. Compared with the conventional technology, the proxy server undertakes a part of functions of the database, and the burden of the database is reduced. In addition, the proxy server is capable of making a quick adjustment based on a change of the spectrum allocation policy of the region managed by the proxy server, and thus the spectrum resource is reasonably allocated. Thus, the flexibility and applicability of the entire spectrum allocation system is improved. The embodiment is applicable to the allocation of white space.

Figure 8:
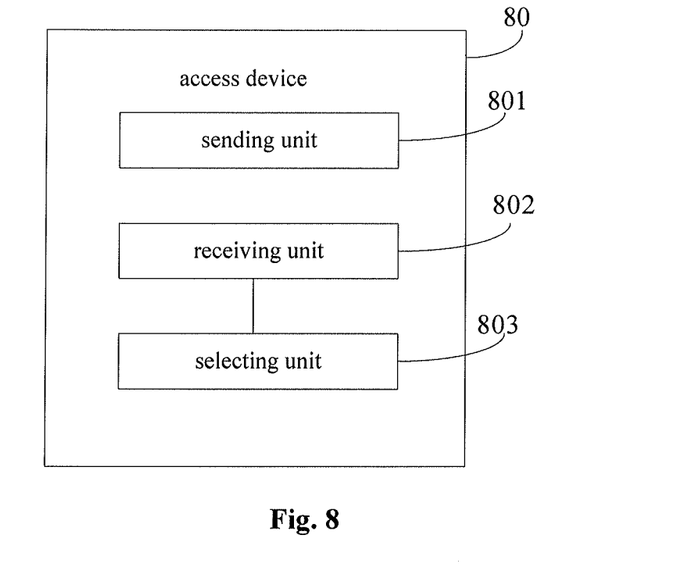
FIG. 8 is a schematic structural diagram of an access device according to an embodiment of the application.

According to an embodiment of the application, an access device 80 is provided as shown in FIG. 8. The access device 80 includes:

a sending unit 801 configured to send a spectrum resource request to a proxy server, where the proxy server allocates at least one spectrum resource range for the access device from the spectrum resources of the region managed by the proxy server, based on a spectrum allocation policy of the proxy server;

a receiving unit 802 configured to receive spectrum resource information including the at least one spectrum range from the proxy server; and a selecting unit 803 configured to obtain available spectrum resources for the access device from the spectrum resource information including the at least one spectrum resource range, where the spectrum resource information is received by the receiving unit 802.

The sending unit 801 is further configured to send a spectrum allocation parameter to the proxy server, where the proxy server calculates available spectrum resources for the access device based on the spectrum allocation policy and the spectrum allocation parameter.

Specifically, the spectrum allocation parameter sent by the sending unit 801 includes any one of a parameter related to the geographic location of the access device, an antenna characteristic of the access device, an application scenario of the access device, a service type of the access device, a terrain parameter of the access device, a capacity requirement of the access device, a surrounding wireless environment parameter of the access device, or any combination thereof.

In the case that the spectrum resource information includes two or more spectrum resource ranges, the receiving unit 802 is further configured to:

scan an adjacent access device to obtain spectrum usage information of the adjacent access device and select available spectrum resources for the access device from the above spectrum resource information based on the spectrum usage information; or scan each of spectrum resource ranges in the spectrum resource information to select unused spectrum resources as the available spectrum resources for the access device.

In particular, the sending unit 801 may further configured to send the spectrum resource request to a corresponding proxy server based on a preset proxy server identifier.

The sending unit 801 may further configured to send the spectrum resource request to the database, where the database redirects the spectrum resource request and sends the redirected spectrum resource request to the proxy server.

Figure 9:
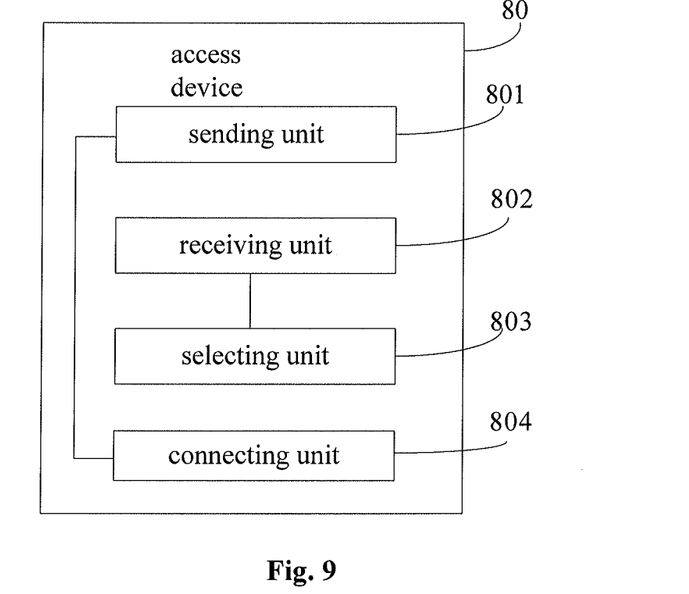
FIG. 9 is a schematic structural diagram of another access device according to an embodiment of the application.

As shown in FIG. 9, the access device 80 may further include:

a connecting unit 804 configured to establish a network connection with a database having a database host identifier based on the preset database host identifier.

The sending unit 801 sends proxy server inquiring information to the database with the database host identifier, to inquire the proxy server, where the region managed by the inquired proxy server covers a location of the access device, where the database with the database host identifier sends available proxy server information to the access device based on the location of the access device.

At this time, the receiving unit 802 receives the available proxy server information and selects the proxy server to which the spectrum resource request will be sent.

According to an embodiment of the application, a spectrum allocation system is provided. The spectrum allocation system includes:

a proxy server according to any one of embodiments of the application;

an access device according to any one of embodiments of the application; and a database configured to manage spectrum resources of the proxy server.

In particular, the spectrum allocation system further includes a terminal device.

The proxy server may include N layers of sub-servers, each layer of which include at least one sub-server, where N is an integer greater than 1.

In the spectrum allocation system according to the embodiment of the application, the proxy server allocates spectrum resources for the access device from the spectrum resources of the region managed by the proxy server based on the spectrum allocation policy of the proxy server. Compared with the conventional technology, the proxy server undertakes a part of functions of the database, and the burden of the database is reduced. In addition, the proxy server is capable of making a quick adjustment based on a change of the spectrum allocation policy of the region managed by the proxy server, and thus the spectrum resource is reasonably allocated. Thus, the flexibility and applicability of the entire spectrum allocation system is improved. The embodiment is applicable to the allocation of white space.

As can be understood by those skilled in the art, all or a part of steps of the above methods of embodiments may be implemented by a program instructing related hardware. The program may be stored in a computer-readable storage medium. When executed, the program performs steps of the above methods of embodiments. The storage medium includes medium that may store codes of a program, such as a ROM, a RAM, a magnetic disk or a optical disk.

Described above is only specifically embodiments of the application, however, the protection scope of the application is not limited thereto. Any variations or alternatives that may be obtained by those skilled in the art within the technical scope of the application should be included in the protection scope of the application. Therefore, the protection scope of the application is in accordance with the protection scope defined by the claims.

What is claimed is:

1. A spectrum allocation method, comprising a proxy server having a processor executing program codes stored in a memory, which configures the proxy server to perform functions, comprising:

obtaining, a spectrum allocation policy of the proxy server;

obtaining spectrum resources of a region managed by the proxy server which are derived from spectrum resources of a region managed by a remote database, where the spectrum resources of the region managed by the remote database were priorly sent by the remote database through a network connection;

receiving a spectrum resource request from an access device, wherein the access device is directly connected to a user equipment (UE) to facilitate allocated spectrum resources from the proxy server to the UE;

allocating at least one spectrum resource range for the access device from the spectrum resources of the region managed by the proxy server based on the spectrum allocation policy; and sending spectrum resource information comprising the at least one spectrum resource range to the access device.

2. The method according to claim 1, wherein the obtaining, by the proxy server, the spectrum resources of the region managed by the proxy server from the spectrum resources of a region managed by the remote database, where the spectrum resources of the region managed by the remote database were priorly sent by the remote database through the network connection, comprises:
   receiving, by the proxy server, spectrum updating information from the remote database; and
   receiving, by the proxy server, the spectrum resources of the region managed by the remote database, and selecting and storing the spectrum resources of the region managed by the proxy server from the spectrum resources of the region managed by the remote database based on a spectrum usage situation of the region managed by the proxy server and the spectrum allocation policy.

3. The method according to claim 1, wherein the obtaining, by the proxy server, the spectrum resources of a region managed by the proxy server from the spectrum resources of a region managed by the remote database, where the spectrum resources of the region managed by the remote database were priorly sent by the remote database comprises:
   sending, by the proxy server, a spectrum updating request to the remote database, wherein the remote database sends the spectrum resources of the region managed by the database to the proxy server in response to the spectrum updating request; and
   receiving, by the proxy server, the spectrum resources of the region managed by the database, and selecting and storing the spectrum resources of the region managed by the proxy server from the spectrum resources of the region managed by the remote database based on a spectrum usage situation of the region managed by the proxy server and the spectrum allocation policy.

4. The method according to claim 1, further comprising:
   receiving, by the proxy server, a spectrum allocation parameter from the access device; wherein
   the allocating, by the proxy server, at least one spectrum resource range for the access device from the spectrum resources of the region managed by the remote database based on the spectrum allocation policy comprises:
   calculating, by the proxy server, available spectrum resources for the access device based on the spectrum allocation policy and the spectrum allocation parameter; and
   selecting, by the proxy server, one spectrum resource range from the available spectrum resources to generate the spectrum resources information; or selecting, by the proxy server, two or more spectrum resource ranges from the available spectrum resources to generate the spectrum resources information.

5. The method according to claim 4, wherein the spectrum allocation parameter comprises one of a parameter related to a geographic location of the access device, an antenna characteristic of the access device, an application scenario of the access device, a service type of the access device, a terrain parameter of the access device, a capacity requirement of the access device, a surrounding wireless environment parameter of the access device, or any combination thereof.

6. A spectrum allocation method, comprising an access device having a processor executing program codes stored in a memory, which configures the access device to perform functions, comprising:
   sending a spectrum resource request to a proxy server, wherein the proxy server allocates at least one spectrum resource range for the access device from spectrum resources of a region managed by the proxy server, based on a spectrum allocation policy of the proxy server, wherein the access device is directly connected to a user equipment (UE) to facilitate allocated spectrum resources from the proxy server to the UE, and the spectrum resources of a region managed by the proxy server were priorly obtained by the proxy server from a remote database through a network connection;
   receiving spectrum resource information comprising the at least one spectrum resource range from the proxy server; and
   obtaining available spectrum resources for the access device from the spectrum resource information comprising the at least one spectrum resource range.

7. The method according to claim 6, wherein after sending, by an access device, a spectrum resource request to a proxy server, the method further comprises:
   sending, by the access device, a spectrum allocation parameter to the proxy server, wherein the proxy server calculates the available spectrum resources for the access device based on the spectrum allocation policy and the spectrum allocation parameter.

8. The method according to claim 7, wherein the spectrum allocation parameter comprises one of a parameter related to a geographic location of the access device, an antenna characteristic of the access device, an application scenario of the access device, a service type of the access device, a terrain parameter of the access device, a capacity requirement of the access device, a surrounding wireless environment parameter of the access device, or any combination thereof.

9. The method according to claim 6, wherein in the case that the spectrum resource information comprises two or more spectrum resource ranges, the obtaining, by the access device, available spectrum resources for the access device from the spectrum resource information comprising the at least one spectrum resource range comprises:
   scanning, by the access device, an adjacent access device to obtain spectrum usage information of the adjacent access device, and selecting, by the access device, the available spectrum resources for the access device from the spectrum resource information based on the spectrum usage information; or
   scanning, by the access device, each of spectrum resource ranges in the spectrum resource information to select unused spectrum resources as the available spectrum resources for the access device.

10. The method according to claim 6, wherein the sending, by an access device, a spectrum resource request to a proxy server comprises:
   sending, by the access device, the spectrum resource request to a proxy server corresponding to a preset proxy server identifier.

11. The method according to claim 6, wherein the sending, by an access device, a spectrum resource request to a proxy server comprises:
   sending, by the access device, the spectrum resource request to the remote database through the network connection, wherein the remote database redirects the spectrum resource request and sends the redirected spectrum resource request to the proxy server.

12. The method according to claim 6, wherein before the sending, by an access device, a spectrum resource request to a proxy server, the method further comprises:

establishing, by the access device, a network connection with the remote database with a preset database host identifier based on the preset database host identifier;

sending, by the access device, proxy server inquiring information to the remote database with the database host identifier, to inquire the proxy server, wherein the region managed by the inquired proxy server covers a location of the access device, and wherein the database with the database host identifier sends available proxy server information to the access device based on the location of the access device; and receiving, by the access device, the available proxy server information, and selecting, by the access device, a proxy server to which the spectrum resource request is to be sent.

13. A proxy server, comprising a processor executing program codes stored in a memory, which configures the proxy server to:

obtain a spectrum allocation policy of the proxy server, obtain spectrum resources of a region managed by the proxy server from spectrum resources of a region managed by a remote database, wherein the spectrum resources of the region managed by the remote database were priorly sent by the remote database through a network connection;

receive a spectrum resource request from an access device, wherein the access device is directly connected to a user equipment (UE) to facilitate allocated spectrum resources from the proxy server to the UE; and allocate at least one spectrum resource range for the access device from the spectrum resources of the region managed by the proxy server based on the spectrum allocation policy, send to the access device the at least one allocated spectrum resource range.

14. The proxy server according to claim 13, wherein the proxy server is further configured to:

receive spectrum updating information from the remote database; and receive the spectrum resources of the region managed by the remote database, and select and store the spectrum resources of the region managed by the proxy server from the received spectrum resources of the region managed by the remote database based on a spectrum usage situation of the region managed by the proxy server and the spectrum allocation policy.

15. The proxy server according to claim 13, wherein the proxy server is further configured to:

send a spectrum updating request to the remote database, wherein the remote database sends the spectrum resources of the region managed by the remote database to the proxy server in response to the spectrum updating request; and receive the spectrum resources of the region managed by the remote database, and select and store the spectrum resources of the region managed by the proxy server from the received spectrum resources of the region managed by the remote database based on a spectrum usage situation of the region managed by the proxy server and the spectrum allocation policy.

16. The proxy server according to claim 13, wherein the proxy server is further configured to receive a spectrum allocation parameter from the access device; and calculate available spectrum resources for the access device based on the obtained spectrum allocation policy and the received spectrum allocation parameter; and select one spectrum resource range from the available spectrum resources to generate the spectrum resource information; or select two or more spectrum resource ranges in the available spectrum resources to generate the spectrum resource information.

17. The proxy server according to claim 13, wherein the spectrum allocation parameter received by the transmission unit comprises one of a parameter related to a geographic location of the access device, an antenna characteristic of the access device, an application scenario of the access device, a service type of the access device, a terrain parameter of the access device, a capacity requirement of the access device, a surrounding wireless environment parameter of the access device, or any combination thereof.

18. An access device, comprising a processor executing program codes stored in a memory, which configures the access device to:

send a spectrum resource request to a proxy server, wherein the proxy server allocates at least one spectrum resource range for the access device from spectrum resources of a region managed by the proxy server based on a spectrum allocation policy of the proxy server, wherein the access device is directly connected to a user equipment (UE) to facilitate allocated spectrum resources from the proxy server to the UE, and the spectrum resources of a region managed by the proxy server were priorly obtained by the proxy server from a remote database through a network connection;

receive spectrum resource information comprising the at least one spectrum resource range from the proxy server; and obtain available spectrum resources for the access device from the spectrum resource information comprising the at least one spectrum resource range.

19. The access device according to claim 18, wherein the access device is further configured to:

send a spectrum allocation parameter to the proxy server, wherein the proxy server calculates the available spectrum resources for the access device based on the spectrum allocation policy and the spectrum allocation parameter.

20. The access device according to claim 19, wherein the sent spectrum allocation parameter comprises one of a parameter related to a geographic location of the access device, an antenna characteristic of the access device, an application scenario of the access device, a service type of the access device, a terrain parameter of the access device, a capacity requirement of the access device, a surrounding wireless environment parameter of the access device, or any combination thereof.

* * * * *